United States Patent

Meier

(10) Patent No.: US 12,246,669 B2
(45) Date of Patent: Mar. 11, 2025

(54) METHOD FOR COMBATING DROWSINESS OF A DRIVER OF A MOTOR VEHICLE AND ELECTRONIC COMPUTING DEVICE

(71) Applicant: Volkswagen Aktiengesellschaft, Wolfsburg (DE)

(72) Inventor: Andreas Meier, Schöningen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 169 days.

(21) Appl. No.: 18/327,730

(22) Filed: Jun. 1, 2023

(65) Prior Publication Data

US 2023/0391284 A1    Dec. 7, 2023

(30) Foreign Application Priority Data

Jun. 1, 2022  (DE) .......................... 102022205571.3

(51) Int. Cl.
*B60R 21/01* (2006.01)
*B60Q 9/00* (2006.01)
*B60R 21/015* (2006.01)

(52) U.S. Cl.
CPC .......... *B60R 21/01566* (2014.10); *B60Q 9/00* (2013.01)

(58) Field of Classification Search
CPC .... B60R 21/01566; B60Q 9/00; G08B 21/06; B60W 40/08; B60W 50/14; B60W 50/16; B60W 2040/0872; B60W 2050/143; B60W 2540/10; B60W 2540/12; B60W 2540/221; G06F 18/24; G06F 18/27

See application file for complete search history.

(56) References Cited

U.S. PATENT DOCUMENTS

| | | | |
|---|---|---|---|
| 6,822,573 B2 | 11/2004 | Basir et al. | |
| 10,235,859 B1 | 3/2019 | Hiles | |
| 10,796,175 B2 | 10/2020 | Shimizu et al. | |
| 2006/0068693 A1 | 3/2006 | Kono et al. | |
| 2007/0296601 A1 | 12/2007 | Sultan et al. | |

(Continued)

FOREIGN PATENT DOCUMENTS

| | | |
|---|---|---|
| DE | 102007060696 A1 | 8/2008 |
| DE | 102019218747 A1 | 6/2021 |
| KR | 20200071195 A | 6/2020 |

OTHER PUBLICATIONS

Corresponding EP Serial No. 23173905.3. Extended Search Report (Apr. 12, 2024).

(Continued)

*Primary Examiner* — Xiao En Mo
(74) *Attorney, Agent, or Firm* — Peter Zura; LOZA & LOZA, LLP

(57) ABSTRACT

Technologies and techniques for combating drowsiness of a driver of a motor vehicle. A calculation rule is used in which a fatigue progression curve, that represents a fatigue development of the driver over time, can be generated based on a parameter set, and specific values for the parameter set are determined for a route ahead. The fatigue progression curve for the route ahead may be determined via the calculation rule using the determined values for the parameter set, and the fatigue progression curve is analyzed. A countermeasure may be initiated depending on a result of the analysis, in which countermeasure at least one value of a variable parameter of the parameter set is specifically changed.

19 Claims, 1 Drawing Sheet

(56) References Cited

U.S. PATENT DOCUMENTS

2010/0241021 A1    9/2010  Morikawa et al.
2015/0223743 A1    8/2015  Pathangay et al.
2019/0392235 A1*  12/2019  Shimizu ................ B60K 28/06

OTHER PUBLICATIONS

German Appln. No. DE 10 2022 205 571.3 Examination Report (Jan. 12, 2023).

* cited by examiner

METHOD FOR COMBATING DROWSINESS OF A DRIVER OF A MOTOR VEHICLE AND ELECTRONIC COMPUTING DEVICE

RELATED APPLICATIONS

The present application claims priority to German Patent App. No. DE 10 2022 205 571.3, to Andreas Meier, filed Jun. 1, 2022, the contents of which is incorporated by reference in its entirety herein.

FIELD OF TECHNOLOGY

The present disclosure relates to methods for combating drowsiness of a driver of a motor vehicle and to an electronic computing device.

BACKGROUND

US 2006/0068693 A1 discloses a method in which an oxygen deficiency of vehicle occupants is detected and the oxygen deficiency is eliminated. By eliminating the oxygen deficiency, altitude sickness of vehicle occupants can be prevented when driving in high mountains. For this purpose, a device is provided which is set up to determine oxygen saturation of the vehicle occupant in the blood and oxygen or carbon dioxide concentration in the vehicle interior. If oxygen deficiency is detected, the interior air in the vehicle can be conditioned to counteract the oxygen deficiency.

In addition, U.S. Pat. No. 10,235,859 B1 discloses a method for reducing drowsiness when driving. The method comprises detecting or predicting drowsy driving conditions of a driver of a motor vehicle and taking steps to reduce them, thereby increasing the safety of the driver and other persons or vehicles in the vicinity of the vehicle. Driver drowsiness can be determined based on personal health/fitness data of the driver.

In addition, KR 20 200 071 195 A discloses an alarm system for detecting driver drowsiness.

SUMMARY

Aspects of the present disclosure are directed to creating solutions that enable a particularly reliable determination of the fatigue of a driver of a motor vehicle as well as a particularly effective countermeasure against fatigue.

Some aspects of the present disclosure are disclosed in the subject matter of the independent claims. Further aspects are disclosed in the dependent claims, the description, and the figures.

In some examples, a method is disclosed for combating drowsiness of a driver of a motor vehicle. The motor vehicle may be configured as an automobile, such as a passenger car. The method is intended to provide technologies and techniques for counteracting fatigue of the driver of the motor vehicle and thus for influencing the development of fatigue of the driver.

In some examples, at least one evaluation criterion is used to determine a fatigue class that represents the driver's fatigue. This means that several different fatigue classes are specified and the at least one evaluation criterion is used to determine to which fatigue class the driver in his current state is to be assigned. The determination of the fatigue class can be carried out using an electronic computing device. The method further includes selecting at least one countermeasure for the determined fatigue class by means of an assignment rule in which different fatigue classes are assigned respective countermeasures. This selection of the at least one countermeasure on the basis of the determined fatigue class can also be carried out via the electronic computing device. For example, the assignment rule may be stored in a memory device accessible by the electronic computing device. All predetermined fatigue classes are stored in the assignment rule, with at least one countermeasure being assigned to each of the predetermined fatigue classes. The respective countermeasures have the purpose of combating fatigue of the driver of the motor vehicle, so that the driver becomes less tired, or becomes tired only later, or becomes tired less quickly.

In some examples, another method is disclosed for combating drowsiness of a driver of a motor vehicle, in which a calculation rule is used by means of which, based on a set of parameters, a fatigue progression curve can be generated which represents fatigue progression of the driver over time. This calculation rule can, for example, be stored in a memory device and thus be saved. The fatigue progression curve thus describes how a driver's level of fatigue is expected to develop over time in the future. The method further comprises determining specific values for the parameter set for a route ahead. The parameter set comprises at least one parameter, or a plurality of parameters. In the method, at least one value for the at least one parameter of the parameter set is determined for the route ahead. The route ahead can be determined, for example, in the case of activated route guidance, based on route data which can be provided by a navigation device. The parameters of the parameter set describe variables that influence the driver's fatigue development. This means that, depending on the value of the respective parameter, the driver's fatigue development is influenced differently.

In some examples, an electronic computing device is disclosed, which is configured to execute at least one of the methods according to the present disclosure. The electronic computing device is configured to determine a fatigue class based on at least one evaluation criterion and to select the at least one countermeasure for the determined fatigue class via the assignment rule and to trigger the at least one selected countermeasure. Alternatively, or in addition, the electronic computing device is set up to use the calculation rule to determine the specific values for the parameter set for the route ahead, to determine the fatigue progression curve for the route ahead by means of the calculation rule using the determined values for the parameter set, to analyze the fatigue progression curve, and to trigger the at least one countermeasure depending on a result of the analysis. Advantages and advantageous further developments of the methods according to the present disclosure are to be regarded as advantages and advantageous further developments of the computing device according to the present disclosure.

Further features should be apparent from the following description of the figures and the drawing. The features and combinations of features mentioned above in the description, as well as the features and combinations of features shown below in the description of the figures and/or in the figures alone, can be used not only in the combination indicated in each case, but also in other combinations or alone, without departing from the scope of the present disclosure.

BRIEF DESCRIPTION OF THE DRAWINGS

The following disclosure is provided in the drawings, in which.

DETAILED DESCRIPTION

Figure 1:
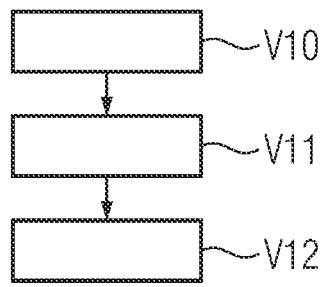
FIG. 1 illustrates a method diagram for a method of combating fatigue of a driver of a motor vehicle according to some aspects of the present disclosure.

Identical elements or elements having the same function are provided with the same reference signs in the figures.

In some examples, methods for combating drowsiness of a driver of a motor vehicle include triggering the at least one selected countermeasure. This triggering of the countermeasure may be performed, for example, via the electronic computing device. By triggering the countermeasure associated with the determined fatigue class of the driver, the countermeasure can be particularly well adapted to the determined fatigue of the driver, as a result of which the fatigue of the driver can be particularly well combated. For example, the fatigue class can characterize the driver's level of fatigue. This means that the fatigue classes can be used to easily provide different countermeasures for different levels of fatigue. As a result, it is possible to combat driver fatigue very efficiently. For example, if the fatigue class determines that the driver is very tired, the assignment rule will select a countermeasure that has a very strong effect on the driver's fatigue and thus counteracts the driver's fatigue very effectively. If it is determined that the driver is only slightly tired, then the assignment rule can be used to select a countermeasure that has only a small effect on the driver's development of fatigue, but has a particularly small effect on the driver's driving experience, for example. The method thus allows the countermeasure selected to be particularly well matched to the detected driver fatigue and to affect the driver's driving experience particularly little or no more than necessary.

In some examples, the fatigue class may be determined based on at least one of the following evaluation criteria. A sensor value of a sensor device can be specified as an evaluation criterion, where the sensor value represents a $CO_2$ content and/or an $O_2$ content of the air in the motor vehicle. The $O_2$ content describes an oxygen content and the $CO_2$ content describes a carbon dioxide content. This means that the fatigue class is determined based on the carbon dioxide and/or oxygen content of the air in the vehicle. The lower the $O_2$ content of the air in the vehicle, or the higher the $CO_2$ content of the air in the vehicle, the more tired the driver of the vehicle is considered to be. This means that a fatigue class is determined for the driver of the motor vehicle, which is determined as a result of the determined $CO_2$ content or the determined $O_2$ content in the air in the motor vehicle. Each fatigue class can therefore be assigned a range of $CO_2$ or $O_2$ content or a combination of $O_2$ and $CO_2$ content. The fatigue class of the driver is thus determined by the range in which the determined $O_2$ content or the determined $CO_2$ content lies.

Alternatively, or in addition, the driver's use of the steering wheel can be used as an evaluation criterion. Different steering wheel speeds or steering frequencies or steering torques applied to the steering wheel of the motor vehicle are assigned to different driver fatigue classes. Further alternatively, or in addition, the use of an accelerator or brake pedal can be used as an evaluation criterion. Here, the use of the accelerator or brake pedal can characterize how often the accelerator or brake pedal is used, or how hard the accelerator or brake pedal is depressed and thus what force is exerted on the accelerator or brake pedal, or how far the accelerator or brake pedal is depressed, or how fast the accelerator or brake pedal is depressed. Further alternatively, or in addition, the occurrence of driving maneuvers classified as critical may be used as an evaluation criterion to determine the driver's fatigue class. In particular, it may be determined how often respective driving maneuvers classified as critical occur within a specified time interval, and the driver's fatigue class may be determined on the basis of the determined frequency of occurrence. Alternatively, or in addition, different criticality levels may be specified for different driving maneuvers, and the driver's fatigue class may be determined depending on a frequency of occurrence of driving maneuvers of respective criticality. The more frequently a driving maneuver classified as critical occurs, the higher the determined driver's fatigue represented by the selected fatigue class.

Further alternatively, or in addition, the degree of openness of the driver's eyes can be used as an evaluation criterion. This means that the driver's eyes can be monitored for their degree of openness using a driver monitoring camera. The more the driver's eyes are closed, the greater the level of fatigue, which is represented by the fatigue class selected for the driver. Further alternatively, or in addition, a physical characteristic of the driver can be used as an evaluation criterion. For example, a driver's height or weight can be selected as an evaluation criterion. Based on these physical characteristics of the driver, the driver's fatigue class can be determined, for example in conjunction with the determined sensor value of the sensor device, for example the determined $CO_2$ content and/or the determined $O_2$ content in the air in the motor vehicle.

For example, a low oxygen content may have a later effect on the fatigue of a driver who is tall and/or heavy compared to a driver who is short and/or light. Alternatively, or in addition, a driver's experience can be used as an evaluation criterion. This means that a driver with more driving experience will tire more slowly than a driver with less driving experience. Thus, the driver's driving experience can be used to reliably determine the driver's current fatigue class for each individual driver. The fatigue class can be determined on the basis of current values of the respective evaluation criteria or current states of the respective evaluation criteria. Alternatively, or in addition, the fatigue class can be determined on the basis of a time course of respective values or respective states of the at least one evaluation criterion. In this way, the fatigue class characterizing the fatigue of the driver can be correctly determined with particularly high reliability.

In examples where the method for combating drowsiness of a driver of a motor vehicle utilizes a fatigue progression curve, a fatigue development curve for the route ahead may be determined based on the calculation rule using the determined values for the parameter set. In other words, the determined values of the parameter set are used in the calculation rule, and thus the fatigue progression curve for the route ahead, which describes how the driver's fatigue progression is expected to develop over the route ahead, is determined using the calculation rule. The method further provides that the fatigue progression curve is analyzed. For example, the fatigue progression curve may be analyzed to determine whether the progression of this fatigue progression curve meets at least one predetermined criterion.

Depending on a result of the analysis, and thus depending on whether it has been determined in the course of the analysis that the fatigue progression curve meets or does not meet the at least one criterion, a countermeasure is triggered by which at least one value of a variable parameter of the parameter set is specifically changed. In this case, the countermeasure has the purpose of combating fatigue of the driver, so that the driver becomes more alert again, and/or of ensuring that the driver reaches a predetermined fatigue level later than at a time predetermined by the fatigue progression curve and thus becomes tired later, and/or of ensuring that the driver tires less quickly. The countermeasure is thus provided for adjusting the at least one parameter of the parameter set in such a way that the driver's fatigue can be combated and thus the driver's fatigue is counteracted. In particular, the countermeasure can be selected depending on which parameter of the parameter set or how much the at least one variable parameter of the parameter set is changed by using the countermeasure.

Thus, by using the countermeasure, the at least one value of the at least one variable parameter of the parameter set is changed and, as a result, the progression of the fatigue progression curve is adjusted. In this context, the use of the countermeasure can cause the fatigue progression curve to be compressed in height and/or stretched in length. For example, the countermeasure can be triggered if it is determined during the analysis of the fatigue progression curve that the driver's level of fatigue on the route ahead exceeds a predefined upper threshold. The analysis thus examines whether the progression of the fatigue progression curve is favorable or unfavorable. If it is determined that the fatigue progression curve is not favorable, the at least one variable parameter is used and the value of that parameter is adjusted.

The determination of the fatigue progression curve via the calculation rule and/or the analysis of the fatigue progression curve can be performed via an electronic computing device. The adjustment of the at least one value of the at least one variable parameter of the parameter set can be triggered by a control unit. The specific values for the parameter set for the route ahead can be determined via a sensing device and provided to the electronic computing device.

In some examples, a warning may be output in the motor vehicle if it is determined during the analysis that at a predetermined future time the level of fatigue of the driver exceeds a predetermined threshold value for this time. The warning may be output visually and/or acoustically and/or haptically in the motor vehicle. The warning can thus inform the driver that at the predetermined future time, the driver's level of fatigue is likely to exceed the predetermined threshold and that the driver is therefore likely to be too tired at that future time.

As a result of receiving the warning, the driver can take action to address the fatigue. For example, the driver may take a break as a result of the warning. The driver can thus begin to combat incipient fatigue in a timely manner, and not only when the driver is already too tired to drive the vehicle safely. This allows the driver to combat incipient fatigue at an early stage. This enables the driver to drive the vehicle safely and attentively.

In some examples, the threshold value may be configured to be specific to a driving section of the route ahead in which the motor vehicle is located at the predetermined time. This means that different threshold values can be specified for different driving sections of the route ahead with respect to each other. As a result, the warning is output in the motor vehicle whenever it is determined that the driver's level of fatigue exceeds the threshold value specific to that driving section when the driver arrives at the respective driving section. For example, one of the driving sections may be an area along the route ahead that requires increased driver concentration, such as a country road with narrow serpentines. Thus, different thresholds can be set for sections of the route that require different levels of effort, depending on the expected demands on the driver. The method thus determines the time at which the driver is in the respective driving sections and the level of fatigue that the driver will exhibit at these respective times. The level of fatigue determined for that point in time is compared to the threshold associated with that driving section. If all detected fatigue levels are below the thresholds assigned to the respective driving sections, no countermeasure is initiated. However, if at least one of the driver's fatigue levels is above the threshold assigned to the corresponding driving section, at least one countermeasure is triggered. This allows the driver to safely steer the motor vehicle along the route ahead, especially if the driver is challenged to a different extent and therefore needs to concentrate to a different degree when steering the motor vehicle on different driving sections.

In some examples, a level of fatigue of the driver for a predetermined test time is predicted based on the fatigue progression curve, the predicted level of fatigue is compared with a level of fatigue of the driver determined for this test time based on sensor data, and the calculation rule is adapted depending on a result of the comparison. This means that the fatigue progression curve is determined, and the expected fatigue level of the driver of the motor vehicle is estimated based on the fatigue progression curve for the predetermined test time. When the test time is reached, the sensor values for that test time are used to determine the actual level of fatigue of the driver of the motor vehicle at that test time. A comparison is then made of how much the estimated, and thus predicted, level of fatigue differs from the actual level of fatigue of the driver of the motor vehicle as determined by the sensor data. If this deviation is greater than a predetermined limit, the calculation rule is adjusted to eliminate any systematic error in the calculation rule. If the deviation between the predicted level of fatigue and the actual level of fatigue of the driver as determined by the sensor data is less than or equal to the predefined limit, the calculation rule remains unchanged. The limit can thus describe a tolerance range for the deviation of the fatigue level estimated based on the fatigue progression curve determined by the calculation rule from the actual fatigue level determined based on the sensor data. This comparison can thus be used to check the calculation rule.

In some examples, the parameter set may include a value of at least one of a plurality of parameters. The parameter can be a number of vehicle occupants. The more vehicle occupants there are in the motor vehicle, the faster an existing $O_2$ content in the air in the motor vehicle can decrease or the faster a $CO_2$ content in the air in the motor vehicle can increase. In addition, an increased number of occupants in the motor vehicle may cause the driver to tire quickly due to distraction. Alternatively, a particularly low number of vehicle occupants may cause the driver to tire particularly quickly due to boredom. Alternatively, or in addition, the temperature inside the vehicle can be used as a parameter. The warmer it is inside the vehicle, the faster the driver tires. Alternatively, or in addition, a characteristic of the driver, in particular height and/or weight and/or level of driving experience, can be used as a parameter. The more driving experience a driver has, the less strenuous the driving of the motor vehicle is for this driver and the slower the driver tires when driving the motor vehicle. In addition, the combination of the driver's height and weight can be used to infer the driver's fitness. For example, it can be assumed that the more fit the driver of the motor vehicle, the less quickly the driver will tire while driving the motor vehicle. The less fit the driver of the motor vehicle is estimated to be, the faster the driver of the motor vehicle is expected to tire while driving the motor vehicle.

In some examples, the number and duration of breaks can be used as a parameter. The more often a driver takes breaks while driving, or the longer the breaks, the slower the driver will tire while driving the motor vehicle, as each of the breaks counteracts driver fatigue. Alternatively, or in addition, a time of day can be used as a parameter. For example, it may be determined that the later the time of day, the faster the driver of the motor vehicle is likely to become tired based on a number of hours the driver has already spent awake. In some examples, the weather can be included as a parameter in the calculation rule. For example, the weather parameter can consider how difficult the road conditions are due to the weather. The more difficult the respective road conditions are determined to be due to the weather, the faster the driver of the motor vehicle is likely to tire while driving the motor vehicle along the route.

In some examples, media usage in the motor vehicle may be used as a parameter. If it is determined that media are being consumed in the vehicle which require a high level of concentration on the part of the driver, then it is determined that the driver is likely to tire particularly quickly. Alternatively, or in addition, a characteristic of the route ahead can be used as a parameter. In this case, the characteristic of the route ahead can indicate how much concentration the steering of the vehicle on the route ahead requires from the driver. The more the driver needs to concentrate on steering the car on the route ahead, the faster the driver will tire. In particular, the interior temperature of the vehicle, the number and duration of breaks, and the use of media in the vehicle are variable parameters of the parameter set. The more of the above parameters are used as components of the parameter set for determining the fatigue progression curve using the calculation rule, the more accurately and reliably the fatigue progression curve can be determined for the driver.

In some examples, the fatigue progression curve may be determined in a driver-specific manner. This means that at least one characteristic of the driver is a mandatory parameter of the parameter set. The driver characteristic may be a height, a weight, a driving experience, a state of health, a state of mind, a starting fatigue, or a daily form. Different fatigue progression curves are thus determined for different drivers of the vehicle based on the calculation rule. Within the scope of the method, it is thus possible to combat the fatigue of the respective driver on a driver-specific basis. In particular, not only can the fatigue progression curve be determined on a driver-specific basis, but the countermeasure can also be selected on a driver-specific basis. This means that the countermeasure that has the best effect on the driver's fatigue progression curve and, in particular, combats the driver's fatigue progression most strongly or most reliably is selected from a number of countermeasures. In this way, the countermeasure that is likely to have the greatest effect in combating the driver's fatigue can be selected on a driver-specific basis. By determining the driver-specific fatigue progression curve, the driver's fatigue development can be predicted very reliably.

In some examples, at least one of a plurality of actions may be carried out as a countermeasure. In one example, a proportion of fresh air in the motor vehicle can be increased as a countermeasure. This means that a supply of fresh air from an environment of the motor vehicle into the interior of the motor vehicle is increased. Alternatively, or in addition, an activated recirculation mode can be deactivated as a countermeasure. This means that if the recirculation mode is activated, it is deactivated and thus fresh air from outside the vehicle is supplied to the interior of the vehicle. Alternatively, or in addition, the air circulation speed in the vehicle can be increased as a countermeasure. In this way, particularly rapid mixing can be achieved, resulting in a particularly even distribution of oxygen and carbon dioxide in the vehicle interior. Areas with locally low oxygen concentration or locally high carbon dioxide concentration can thus be reliably avoided. Alternatively, or in addition, at least one window of the motor vehicle can be opened as a countermeasure. By opening the window of the motor vehicle, a large quantity of fresh air can be introduced particularly quickly into the interior of the motor vehicle, as a result of which an oxygen content of the air in the interior of the motor vehicle can be increased particularly quickly and a carbon dioxide content can be reduced particularly quickly.

Alternatively, or in addition, a warning may be given to the driver in the motor vehicle as a countermeasure. This warning can be acoustic and/or visual and/or haptic. The warning can make the driver aware of a negative development of fatigue, which allows the driver to take measures against fatigue. For example, the driver can take at least one break to combat fatigue. Alternatively, or in addition, a volume level of audio outputs in the vehicle can be increased as a countermeasure. By increasing the volume level of audio outputs in the motor vehicle, the driver of the motor vehicle may be alerted, thereby combating driver fatigue. Alternatively, or in addition, as a countermeasure, a blue light component of at least one screen in the motor vehicle may be increased. By increasing the blue light component of the display, the formation of the sleep hormone melatonin can be inhibited, thereby combating driver fatigue. Alternatively, or in addition, as a countermeasure, the driver can be jolted by means of reversible belt pretensioners. As a countermeasure, these reversible pretensioners can be alternately loosened and tightened at short intervals, causing the driver to be jolted. This jolting of the driver can shake the driver awake and thus combat driver fatigue.

Alternatively, or in addition, as a countermeasure, at least one break can be scheduled by changing a navigation route. This means that when route guidance is activated, a navigation device can be used to adjust the navigation route so that at least one additional break is planned along the route ahead. During this break, the driver can recover from driving the motor vehicle, thereby combating increasing driver fatigue. Alternatively, or in addition, a charging strategy of the motor vehicle can be adapted as a countermeasure. This means that, depending on the determined fatigue progression curve, an earlier charging stop for the motor vehicle can be scheduled and/or more frequent charging stops for the motor vehicle can be scheduled, so that the driver can recover during these charging stops, whereby increasing driver fatigue can be combated. At least one of said countermeasures, in particular more than one of said countermeasures, can be triggered in order to influence the fatigue progression curve and thus to be able to combat driver fatigue particularly well.

While driving a motor vehicle, the driver of the motor vehicle may become tired, which may lead to dangerous situations. In order to avoid these dangerous situations as much as possible, it is necessary to combat driver fatigue. There are a plurality of methods to do this.

In a first method for combating drowsiness of the driver of the motor vehicle, the method diagram of which is shown in FIG. 1, it is provided that in a first method step V10 a fatigue class is determined based on at least one evaluation criterion, which class represents the fatigue of the driver. A sensor value of a sensor device can be used as an evaluation criterion. The sensor value can represent at least a $CO_2$ content and/or an $O_2$ content of the air in the motor vehicle. Alternatively, or in addition, a steering wheel actuation and/or a use of an accelerator or brake pedal and/or a degree of opening of the driver's eyes and/or a physical characteristic of the driver and/or a driving experience of the driver and/or an occurrence of driving maneuvers classified as critical can be used as an evaluation criterion.

In a second method step V11 of the first method, it is provided that at least one countermeasure for the determined fatigue class is selected by means of an assignment rule in which respective countermeasures are assigned to different fatigue classes. Furthermore, in the first method it is provided that in a third method step V12 the at least one selected countermeasure is triggered. Thus, in the first method, an oxygen/carbon dioxide sensor in an air conditioning system of the motor vehicle can be used to determine how tired the occupants of the motor vehicle are based on the exhaled air. For this purpose, the air conditioning system can be equipped with the oxygen/carbon dioxide sensor. Furthermore, the motor vehicle may comprise a control unit, which may be located in the area of a control panel, wherein the control unit is arranged to perform method steps of the first method and thus to detect and combat fatigue of the driver of the motor vehicle.

In the first method, the current fatigue of the driver is estimated. For this purpose, the control unit arranged in the motor vehicle receives a plurality of pieces of information via a sensor system in the motor vehicle. The control unit may, for example, be part of an infotainment system and/or a central computer of the motor vehicle. As information, the control unit can receive data of a steering wheel actuation for tracking a steering behavior. Alternatively, or in addition, the control unit may receive data from an interior camera via the sensor system about detected eyes of the driver, including the degree of opening of the eyes. Alternatively, or in addition, the control unit can receive data about use of the accelerator and/or brake pedal. Further, the control unit may receive data from driver assistance systems of the motor vehicle in the form of statistics about driving maneuvers detected as critical, such as tailgating or lane departure. Alternatively, or in addition, the control unit may receive data about the driver, such as height, weight, and/or driving experience. Alternatively, or in addition, the control unit may receive data from an oxygen or carbon dioxide sensor as part of the air conditioning system. The data may be processed by the control unit as single values and/or as values over time.

To process this data, one or more classifiers can be used to determine the driver's level of fatigue and classify it into one of several fatigue classes. Machine learning techniques such as neural networks, support vector machines, random forests, decision trees, or approaches such as fuzzy systems can be used as classifiers. These machine learning methods are trained on real driving data of the evaluation criteria, including a label of driver fatigue. Approaches such as principal component analysis and the like can be used to filter the data beforehand or to arrive at linear combinations that are easier to process.

The oxygen and carbon dioxide content of the air inside the vehicle can be directly measured to determine fatigue. Since this air is regularly circulated through an internal ventilation system and the air conditioning system, an oxygen or carbon dioxide sensor in the air conditioning system can determine the levels of these gases in the interior air. If the oxygen level drops or the carbon dioxide level rises above a certain threshold over a certain period of time, this indicates that the driver is tired or beginning to feel tired because the brain is not being supplied with sufficient oxygen and the driver's concentration is suffering. As a result, the driver's fatigue class is determined based on the oxygen or carbon dioxide levels in the interior air.

Depending on the fatigue class, different countermeasures can be taken, especially by the vehicle. One countermeasure is to increase the proportion of outside air in the vehicle in order to increase the oxygen content of the interior air. Alternatively, or in addition, an activated recirculation mode can be deactivated or a ventilation system can be turned up in an automatic mode, thereby increasing a recirculation speed. Alternatively, or in addition, the windows of the motor vehicle can be opened or an air mixture can be changed via the air conditioning system and at the same time the recirculation speed can be increased. Further alternatively, or in addition, the driver can be alerted to fatigue by a warning and/or a volume level of an infotainment system can be increased and/or a blue light component of displays in the motor vehicle can be increased and/or the driver can be jolted awake by reversible seat belt pretensioners and/or a break can be planned by changing a navigation route.

Figure 2:
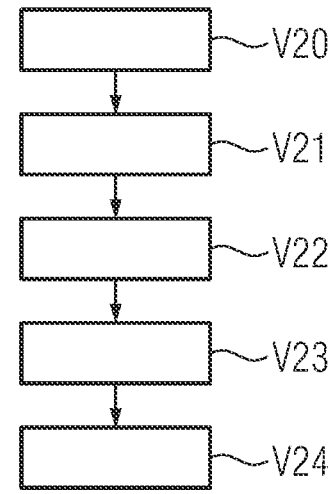
FIG. 2 illustrates a method diagram for another method for combating drowsiness of a driver of a motor vehicle according to some aspects of the present disclosure.

FIG. 2 is a method diagram for another, second, method for combating driver fatigue in a motor vehicle according to some aspects of the present disclosure. The second method makes it possible to predict the driver's fatigue over time, so that it is possible to detect early on that the driver is getting tired before his concentration begins to wane. The system incorporates navigation data and many other environmental and driver characteristics to provide highly accurate fatigue detection and prediction. By predicting the progression of driver fatigue, there are many ways to gently counteract fatigue and increase driving safety. The second method allows predictive countermeasures against fatigue to be initiated.

Figure 3:
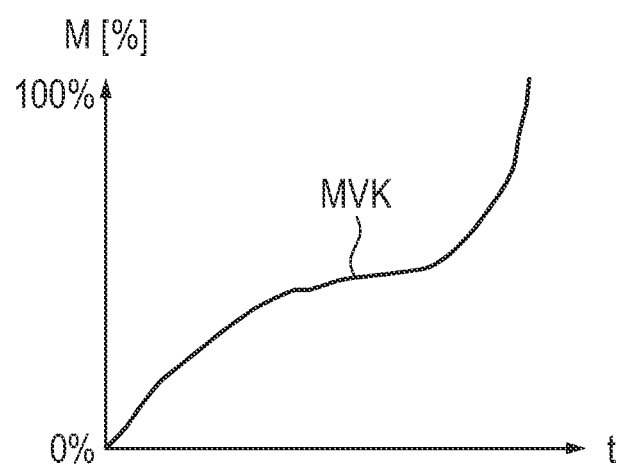
FIG. 3 illustrates a fatigue progression curve characterizing a progression of a fatigue level of the driver of the motor vehicle over time, according to some aspects of the present disclosure.

For this purpose, it is provided in a first method step V20 of the second method that a calculation rule is used with which, based on a parameter set, a fatigue progression curve (FPC) can be generated which represents a fatigue development of the driver over time. Furthermore, it is provided that in a second method step V21 concrete values for the parameter set are determined for a route ahead. In addition, in a third method step V22, it is provided that the fatigue progression curve (FPC) for the route ahead is determined by means of the calculation rule using the determined values for the parameter set. Furthermore, in a fourth method step V23, the fatigue progression curve (FPC) is analyzed. This fatigue progression curve is shown in FIG. 3. Here, the fatigue progression curve (FPC) describes a development of the level of fatigue (F) in percent over time (t). In a fifth method step V24 of the method, it is provided that, depending on a result of the analysis, a countermeasure is triggered by which at least one value of a variable parameter of the parameter set is specifically changed.

The example of FIG. 2 is configured to predict the expected fatigue at a given future time, and not the current time. The basic idea is that fatigue is a function of time, in this case the fatigue progression curve (FPC). This means that if you wait long enough, everyone will get tired and fall asleep, with sleep corresponding to a fatigue level of 100 percent. This progression of the fatigue progression curve (FPC) can be influenced, as for example very demanding activities make the driver tired faster, so that the fatigue progression curve (FPC) is compressed in its length, or by sufficient air supply, movement, energy increase, etc. the driver can be awake and active longer, so that the progression of the fatigue progression curve (FPC) is stretched in its length. Furthermore, this fatigue progression curve (FPC) is individual to the person. In the second method, the fatigue progression curve (FPC) is determined in a driver-specific manner. Data from a previous trip or other previous trips may be considered in order to determine a particularly precise driver-specific fatigue progression curve (FPC).

In the example of FIG. 2, the progression of the fatigue progression curve (FPC) is predicted by the control unit by means of a fatigue prediction. The time (t) can be assumed to be continuous or discrete, e.g., considering time points with an interval of ten minutes. The level of fatigue (F) can be considered continuous or discrete. For example, a fatigue class may include an interval of fatigue levels of 20 percentage points. For example, all fatigue levels from 0 percent to 20 percent are assigned to a first common fatigue class, all fatigue levels from 20 percent to 40 percent are assigned to a second common fatigue class, all fatigue levels from 40 percent to 60 percent are assigned to a third common fatigue class, all fatigue levels from 60 percent to 80 percent are assigned to a fourth common fatigue class, and all fatigue levels from 80 percent to 100 percent are assigned to a fifth common fatigue class.

A regression method such as classical polynomial regression, prioritized grammar enumeration or artificial neural networks and/or classification methods such as the machine learning methods mentioned above can be used to determine the fatigue classes.

The control unit which performs the prediction by means of the calculation rule may receive an indication of a number of persons in the motor vehicle for determining the fatigue progression curve (FPC), wherein the number of persons may be determined by means of an occupancy sensor system of seats of the motor vehicle. Furthermore, the control unit can receive a planned or assumed navigation route, in particular with respect to a remaining driving time and/or characteristics of the route. These characteristics of the route may describe long, monotonous highway sections or winding, varied routes and/or upcoming passages through industrial areas or agricultural regions where the probability of activation of the recirculation function increases and/or upcoming passages through tunnels with poor fresh air and/or upcoming altitude differences and/or upcoming traffic incidents or complicated driving situations requiring a particularly high level of concentration. The upcoming altitude differences are relevant for determining the fatigue progression curve (FPC), since the higher the vehicle is above sea level, the lower the air pressure and thus the oxygen supply. Further alternatively, or in addition, the control unit may receive a set interior temperature and/or a number of breaks taken as well as their duration and/or a time of day and/or information about the weather and/or characterizations of the driver. Here, the characterizations of the driver may describe whether the driver is an experienced driver who can drive safely with less concentration. Alternatively, or in addition, the driver characterizations may describe physical characteristics of the driver, such as height and weight. This information can be incorporated into the calculation rule in the form of parameters.

In particular, the control unit is an electronic computing device. The control unit can determine when the oxygen concentration is too low and thus when the driver becomes tired, based on knowledge of the persons present and a change in the oxygen/carbon dioxide concentration in the motor vehicle.

Based on the knowledge of the remaining route including the abovementioned data of the parameter set, the fatigue progression curve (FPC) can be determined and on this basis a statement can be made as to how high the driver's concentration should be or how the oxygen/carbon dioxide concentration will change while driving. The control unit can thus predict with a certain probability when the driver will be tired and how tired he will be, so that gentle countermeasures can be initiated in good time. As a countermeasure, the oxygen concentration in the interior air can be increased by adjusting the air conditioning/ventilation control, fatigue of the driver can be combated by an early warning and/or by changing the navigation route. For electric vehicles in particular, a charging strategy can be adapted as a countermeasure to force the driver to take a break. The overall effect of these countermeasures is to protect the driver from fatigue before it affects his concentration.

In this way, the control unit takes into account processes that contribute to fatigue, such as a drop in the oxygen concentration, difficult routes, driving with recirculated air, and inexperienced drivers, as well as processes that prevent fatigue, such as the use of an automatic climate control system that adjusts the supply of fresh air for a particularly high oxygen content, a varied route that is not too strenuous, and breaks, thus constantly predicting the progression of fatigue.

With the help of the control unit, a comparison can be made as to whether a maximum level of fatigue is possible for certain sections of the route ahead, in order to explicitly warn the driver in advance. In other words, a warning is issued in the vehicle if the analysis determines that a driver's level of fatigue exceeds a predetermined threshold at a predetermined future time. This threshold is specific to a driving section of the route ahead in which the vehicle is located at the predetermined time.

The calculation rule, which is a model for predicting fatigue progression, can be generated during development based on study data. In order to further develop the second method for the calculation rule, the first method can be used. For this purpose, the predictions of the second method can be stored for upcoming points in time and then, when these points in time are reached, the current fatigue of the driver can be determined or detected using the first method. Using the difference between the current, detected fatigue and the predicted fatigue, and taking into account the data available at the time of the prediction, the calculation rule and thus the model for predicting the progression of fatigue can be adapted so that the model continues to learn and adapts better and better to the driver. In other words, the driver's level of fatigue (F) is predicted for a given test time based on the fatigue progression curve (FPC), the predicted level of fatigue (F) is compared with a driver's level of fatigue (F) determined for this test time based on sensor data, and the calculation rule is adapted depending on a result of the comparison.

The use of the oxygen/carbon dioxide sensor allows the most accurate detection of driver fatigue. By taking driver characteristics into account, individual driver-specific fatigue detection is possible, which makes it possible to determine the fatigue progression curve (FPC) very accurately, since people become tired at different rates. The second method, which allows fatigue prediction, provides a particularly good strategy for preventing drivers from becoming too tired. By taking into account a variety of data, especially the upcoming route and its characteristics, the driver's fatigue can be predicted. By implementing the countermeasures gradually and thus one after the other, the driver can slow down the increase of the level of fatigue (F) without noticing it, and a correct fatigue warning can be displayed only at a late stage, thus achieving a particularly high level of acceptance of the fatigue detection by the driver. In addition, the methods enable an increase in road safety.

In the first method, it is thus provided that different sensor values are received, at least the current fatigue class of the driver is determined based on the sensor values, and the countermeasure dependent on the fatigue class is triggered. In the second method, it is provided that the fatigue progression curve (FPC) is generated for the fatigue progression of the driver over time (t). Different threshold values may be provided for different driving sections of the route ahead, and a maximum permissible level of fatigue may be specified as a threshold value for each driving section.

The fatigue prediction and the countermeasures initiated in dependence thereon can reduce the risk of accidents or errors.

Overall, the invention discloses methods for fatigue detection, in particular predictive fatigue detection, and fatigue countermeasures.

LIST OF REFERENCE SIGNS

V10 to V24 respective method steps
FPC fatigue progression curve
F level of fatigue
t time

The invention claimed is:

1. A method for combating drowsiness of a driver of a motor vehicle, comprising:
    determining a fatigue class representing a fatigue level of the driver, wherein the fatigue class is determined based on at least one evaluation criterion;
    selecting at least one countermeasure for the determined fatigue class using an assignment rule in which different fatigue classes are assigned respective countermeasures; and
    triggering the at least one selected countermeasure.

2. The method according to claim 1, wherein determining the fatigue class comprises at least one of the following evaluation criteria:
    sensor value of a sensor device, the sensor value representing a $CO_2$ content and/or an $O_2$ content of the air in the motor vehicle;
    actuation of a steering wheel;
    use of an accelerator or brake pedal;
    an occurrence of driving maneuvers classified as critical;
    a degree of openness of the driver's eyes;
    a physical characteristic of the driver; and/or
    the driver's driving experience.

3. The method according to claim 1, wherein the countermeasure comprises at least one of:
    increasing a proportion of fresh air in the motor vehicle;
    deactivating an activated recirculation mode;
    increasing a circulation speed of the air in the motor vehicle;
    opening at least one window of the motor vehicle;
    outputting a warning to the driver in the motor vehicle;
    increasing a volume level of audio outputs in the motor vehicle;
    increasing a blue light level of at least one screen in the motor vehicle;
    jolting a driver by means of reversible seat belt pretensioners;
    planning at least one break by changing a navigation route;
    adapting a charging strategy of the motor vehicle.

4. A method for combating drowsiness of a driver of a motor vehicle, comprising:
    processing a calculation rule based on a parameter set to generate a fatigue progression curve representing a fatigue development of the driver over time;
    determining values for the parameter set for a driving route;
    determining a predicted fatigue progression curve for the driving route based on the calculation rule using the determined values for the parameter set;
    processing the predicted fatigue progression curve; and
    initiating a countermeasure based on the processed predicted fatigue progression curve, wherein the countermeasure comprises changing at least one value of a variable parameter of the parameter set.

5. The method according to claim 4, further comprising outputting a warning in the motor vehicle if the processing of the predicted fatigue progression curve determines that a level of fatigue of the driver will exceed a predetermined threshold value in a configured future time.

6. The method according to claim 5, wherein the threshold value is specific to a driving section of the driving route in which the motor vehicle is located at the configured time.

7. The method according to any of claim 4, wherein processing the predicted fatigue progression curve comprises comparing the fatigue progression curve with a current level of driver fatigue determined from sensors over a configured test time.

8. The method according to claim 7, further comprising adapting the calculation rule based on the comparing of the fatigue progression curve with the current level of driver fatigue.

9. The method according to any of claim 4, wherein the parameter set comprises a value based on at least one of the following parameters:
    a number of vehicle occupants;
    an interior temperature of the motor vehicle;
    a characteristic of the driver, comprising height and/or weight and/or level of driving experience;
    a number and a duration of breaks taken;
    a time of day;
    a weather condition;
    media use in the motor vehicle; and/or
    characteristics of the driving route ahead for the motor vehicle.

10. The method according to claim 4, wherein generating the fatigue progression curve comprises generating the fatigue progression curve specific to the driver of the motor vehicle.

11. The method according to claim 4, wherein the countermeasure comprises at least one of:
    increasing a proportion of fresh air in the motor vehicle;
    deactivating an activated recirculation mode;
    increasing a circulation speed of the air in the motor vehicle;
    opening at least one window of the motor vehicle;
    outputting a warning to the driver in the motor vehicle;
    increasing a volume level of audio outputs in the motor vehicle;
    increasing a blue light level of at least one screen in the motor vehicle;

jolting a driver by means of reversible seat belt pretensioners;

planning at least one break by changing a navigation route; and/or adapting a charging strategy of the motor vehicle.

12. An apparatus for combating drowsiness of a driver of a motor vehicle, comprising:
one or more sensors; and
an electronic computing device, operatively coupled to the one or more sensors, the electronic computing device being configured to:
process a calculation rule based on a parameter set to generate a fatigue progression curve representing a fatigue development of the driver over time;
determine values for the parameter set for a driving route;
determine a predicted fatigue progression curve for the driving route based on the calculation rule using the determined values for the parameter set;
process the predicted fatigue progression curve; and
initiate a countermeasure based on the processed predicted fatigue progression curve, wherein the countermeasure comprises changing at least one value of a variable parameter of the parameter set.

13. The apparatus according to claim 12, wherein the electronic computing device is further configured to output a warning in the motor vehicle if the processing of the predicted fatigue progression curve determines that a level of fatigue of the driver will exceed a predetermined threshold value in a configured future time.

14. The apparatus according to claim 13, wherein the threshold value is specific to a driving section of the driving route in which the motor vehicle is located at the configured time.

15. The apparatus according to any of claim 12, wherein the electronic computing device is further configured to process the predicted fatigue progression curve by comparing the fatigue progression curve with a current level of driver fatigue determined from sensors over a configured test time.

16. The apparatus according to claim 15, wherein the electronic computing device is further configured to adapt the calculation rule based on the comparing of the fatigue progression curve with the current level of driver fatigue.

17. The apparatus according to any of claim 12, wherein the parameter set comprises a value based on at least one of the following parameters:
a number of vehicle occupants;
an interior temperature of the motor vehicle;
a characteristic of the driver, comprising height and/or weight and/or level of driving experience;
a number and a duration of breaks taken;
a time of day;
a weather condition;
media use in the motor vehicle; and/or
characteristics of the driving route ahead for the motor vehicle.

18. The apparatus according to claim 12, wherein the electronic computing device is further configured to generate the fatigue progression curve by generating the fatigue progression curve specific to the driver of the motor vehicle.

19. The apparatus according to claim 12, wherein the countermeasure comprises at least one of:
increasing a proportion of fresh air in the motor vehicle;
deactivating an activated recirculation mode;
increasing a circulation speed of the air in the motor vehicle;
opening at least one window of the motor vehicle;
outputting a warning to the driver in the motor vehicle;
increasing a volume level of audio outputs in the motor vehicle;
increasing a blue light level of at least one screen in the motor vehicle;
jolting a driver by means of reversible seat belt pretensioners;
planning at least one break by changing a navigation route; and/or
adapting a charging strategy of the motor vehicle.

* * * * *